US006017022A

United States Patent [19]

Shirtum

[11] Patent Number: 6,017,022

[45] Date of Patent: Jan. 25, 2000

[54] SHEAR MIXING APPARATUS AND USE THEREOF

[75] Inventor: Robert Page Shirtum, Freeport, Tex.

[73] Assignee: The Dow Chemical Company, Midland, Mich.

[21] Appl. No.: 09/140,306

[22] Filed: Aug. 26, 1998

Related U.S. Application Data

[62] Division of application No. 08/798,594, Feb. 11, 1997, Pat. No. 5,845,993, which is a continuation of application No. PCT/US96/16200, Oct. 10, 1996

[60] Provisional application No. 60/005,205, Oct. 12, 1995, abandoned.

[51] Int. Cl.[7] .............................. B01D 47/02; B01F 13/02

[52] U.S. Cl. .............................. 261/75; 366/101; 366/349

[58] Field of Search .............................. 366/101, 107, 366/173.1, 173.2, 174.1, 175.2, 348, 349; 261/75, 76, 77, DIG. 75; 210/150

[56] References Cited

U.S. PATENT DOCUMENTS

| | | | |
|---|---|---|---|
| 1,496,345 | 6/1924 | Lichtenthaeler | 366/174.1 |
| 2,784,948 | 3/1957 | Pahl et al. | 366/174.1 |
| 3,545,731 | 12/1970 | McManus | 261/75 |
| 3,936,382 | 2/1976 | White | 366/107 |
| 4,522,151 | 6/1985 | Arbisi et al. | 261/DIG. 75 |
| 4,674,888 | 6/1987 | Carlson | 366/101 |
| 4,884,500 | 12/1989 | Iwasaki et al. | 366/107 |
| 5,035,842 | 7/1991 | Mohn | 261/DIG. 75 |
| 5,135,684 | 8/1992 | Mohn et al. | 261/75 |

*Primary Examiner*—Tony Soohoo

[57] ABSTRACT

Shear mixing apparatuses and associated methods are disclosed for producing small gas bubbles of a diameter of less than about 0.1 millimeters in a liquid, whereby mass transfer of the gas into the liquid is improved (as compared to the mass transfer achieved by conventional large bubble generators under the same circumstances) in applications benefiting by such improved mass transfer, involving injecting a gas under pressure via one or more orifices into a liquid that is flowing at a velocity sufficient to cause bubbles formed at the orifice(s) to subdivide to the desired small bubble size.

2 Claims, 6 Drawing Sheets

SHEAR MIXING APPARATUS AND USE THEREOF

CROSS-REFERENCE TO RELATED APPLICATIONS

This application is a divisional of U.S. application Ser. No. 08/798,594, filed on Feb. 11, 1997, now issued as U.S. Pat. No. 5,845,993, which is a continuation under 35 USC 111(a) of PCT/US 96/16200, filed on Oct. 10, 1996 and designating the United States, which in turn is a continuation-in-part of U.S. application Ser. No. 60/005,205, which was filed on Oct. 12, 1995 under 35 USC 111(b) now abandoned.

BACKGROUND OF THE INVENTION

This invention relates generally to a shear mixing apparatus and its use in various processes. This invention relates more particularly to a shear mixing apparatus that generates very small bubbles and to use of the apparatus to supply a gas to a liquid medium. This invention relates still more particularly to such an apparatus and its use to enhance mass transfer of a reactive gas in applications such as a chemical or biological reaction. One such reactive gas is oxygen.

M. Motarjemi and G. J. Jameson, in "Mass Transfer from Very Small Bubbles—The Optimum Bubble Size for Aeration", Chemical Engineering Science, Volume 33, pages 1415–1423 (1978), teach that bubbles are frequently used for mass transfer purposes, especially in systems where oxygen is dissolved in water. They suggest, at page 1422, a need for developing practical new ways to make "very small bubbles, less than 1 mm in diameter, in large quantities." G. J. Jameson, in "Bubbles in Motion", Trans IChemE, Vol. 71, Part A, pages 587–594 (November 1993), provides an overview of Professor John Davidson's contributions to the study of bubbles and gas-liquid two-phase flows. At page 592, he discusses problems inherent in generating small bubbles by reducing diffuser mean hole diameter. The problems include dramatic increases in pressure drop across the diffuser and potential blocking of the hole by solids present in bodies of water such as sewage ponds. At page 593, he discusses bubble coalescence and notes that it will be necessary to impart a force to bubbles in order to remove them quickly from the orifice to prevent coalescence. Possible means of imparting such a force include a fluid cross-flow over the orifice or an oscillation applied either to the orifice itself or to gas within the orifice.

SUMMARY OF THE INVENTION

In a first aspect, the present invention provides a shear mixing apparatus which is capable of generating bubbles which are less than 1 millimeter in diameter without at the same time incurring the problems mentioned by Jameson in regard to reducing diffuser mean hole diameter in conventional bubble-generating apparatus, the apparatus of the present invention comprising:

at least one conduit for carrying a first fluid to be mixed, which has an open first end for receiving the first fluid to be mixed and a closed second end, with one or more apertures being defined in each of these conduits proximate to the closed second end thereof, through which a fluid received in the open first end exits the conduit;

a mixer body defined generally about the conduit or conduits and having a closed first end which defines a corresponding aperture or apertures therein through which the respective conduit or conduits pass, the mixer body further having a second end which defines a restricted orifice with each such conduit and with respect to a hollow space enclosed by the mixer body and defined between the closed first end and the second end of the mixer body, with the apertures in each of the conduits being positioned substantially in the restricted orifice associated with a given conduit; and a second fluid supply conduit in fluid communication with the hollow space enclosed by the mixer body, for providing a second fluid thereto which is passed through the one or more restricted orifices at the second end of the mixer body and which mixes in a shearing manner with the first fluid supplied from the apertures positioned in the respective restricted orifice.

A second aspect of the present invention concerns a shear mixing apparatus which comprises:

one or more conduits for providing a first fluid to be mixed, with each such conduit defining one or more apertures therein over a length of the respective conduit;

a mixer body having a first end and a second end and defining between its first and second ends a generally enclosed hollow space with which a fluid supply conduit is in fluid communication, with the first and second ends of the mixer body each having defined therein a respective corresponding opening for receiving an aperture-bearing conduit therethrough so that the apertures in the conduit(s) providing the first fluid to be mixed are placed in fluid communication with the hollow space.

A third aspect of the present invention concerns a third, related embodiment of a shear mixing apparatus, which comprises a hollow gas and liquid receiving subassembly, a bubble generating subassembly and, optionally, a handle, the gas and liquid receiving subassembly being operatively connected to, and in fluid communication with, the bubble generating subassembly.

The gas and liquid receiving subassembly for this third embodiment desirably comprises:

a central conduit having an open inlet end for receiving a liquid therein and an outlet end in fluid communication with the bubble generating subassembly; and a gas receiving housing which is disposed generally about and is spaced apart from the central conduit so as to define a passageway for the flow of a gas therethrough to the bubble-generating subassembly, and which includes at least one gas-receiving passageway for receiving a gas therethrough and communicating the same via the passageway to the bubble-generating subassembly, with the gas receiving housing being joined at one of its ends in a gas-tight relationship to the central conduit at a point closer to the inlet end of the central conduit than to its outlet end.

The bubble-generating subassembly in the third shear-mixing apparatus desirably comprises a base plate which is joined to the central conduit adjacent its outlet end in a gas-tight relationship, a gas and liquid distribution housing for containing and distributing gas and liquid received from the gas receiving housing and central conduit, respectively, and which is joined to the base plate in a gas-tight relationship, and a cover plate which in turn is joined to the gas and liquid distribution housing in a gas-tight relationship, the gas and liquid distribution housing having a central, funnel-shaped fluid expansion housing that with the base and cover plates divides the bubble generating subassembly into an upper, liquid expansion chamber and a lower, gas expansion chamber, the funnel-shaped fluid expansion housing having a hollow stem that fits in a generally gas-tight seal over a portion of the central conduit proximate to the outlet end of the central conduit and an outward-projecting, peripheral extension from said hollow stem that has defined therein a plurality of apertures that are in fluid communication with the gas expansion chamber and a plurality of fluid channels that are in fluid communication with the liquid expansion chamber, with the apertures being in fluid communication with the fluid channels for mixing of the gas and liquid conveyed therethrough. The fluid channels are preferably separated from each other by fluid diverters that are also defined in the outward-projecting peripheral extension from the hollow stem.

A fourth aspect of the invention relates to a method of generating gas bubbles in a liquid which have a diameter of less than about 0.1 millimeters, the method comprising:

a. placing a gas under a pressure that is sufficient to form gas bubbles when the gas is introduced into a liquid by way of at least one aperture in a member or element separating the gas and liquid; and b. flowing the liquid past the aperture at a flow velocity sufficient to provide a Weber number that exceeds a critical Weber number for the gas and liquid in order to achieve a desired bubble diameter.

DETAILED DESCRIPTION OF THE PREFERRED EMBODIMENTS

Figure 1:
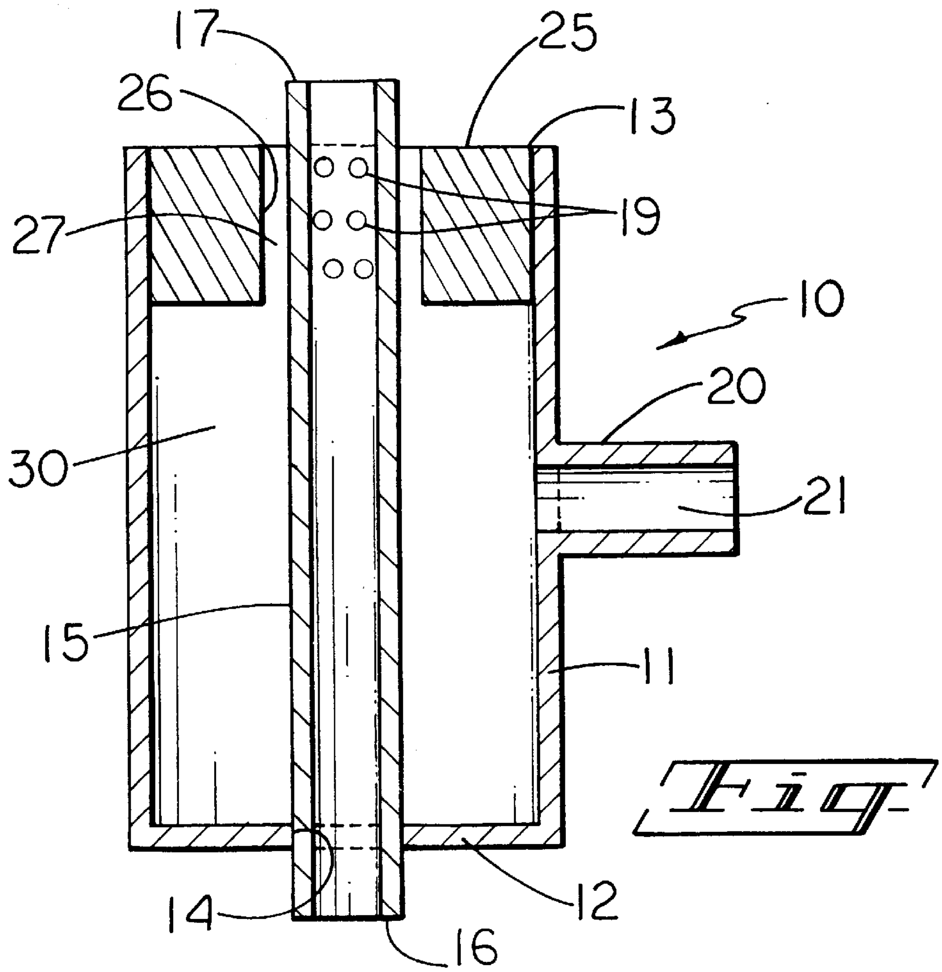
FIG. 1 is an axial schematic sectional view of a shear mixing apparatus of this invention, in a first embodiment and according to the first aspect mentioned above.
Figure 2:
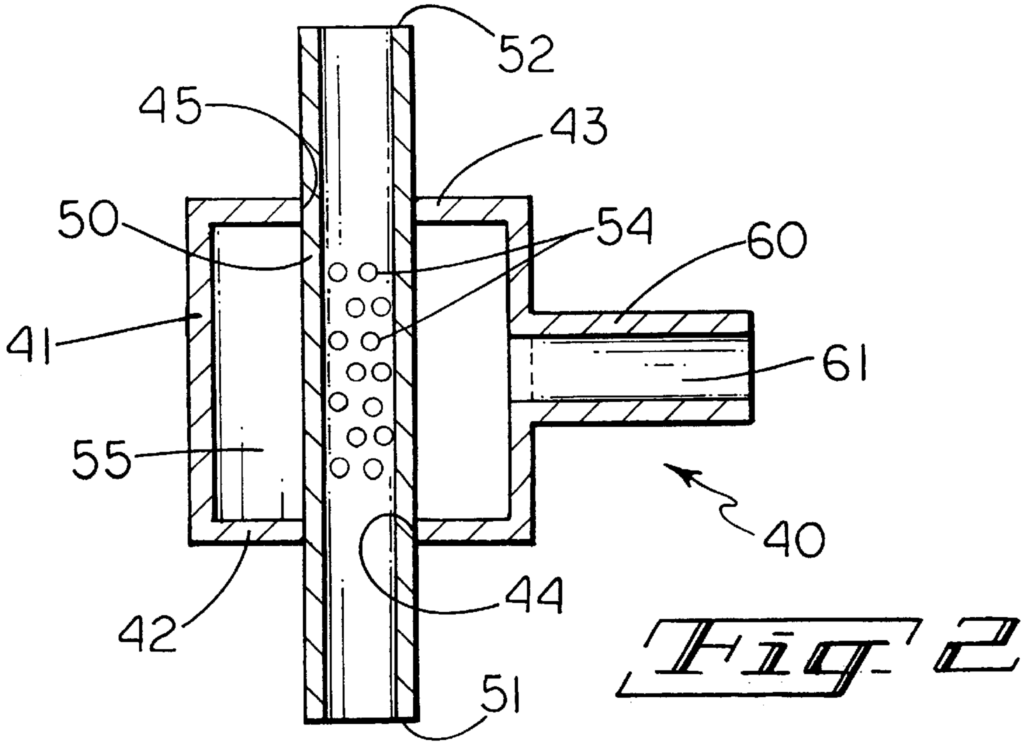
FIG. 2 is an axial schematic sectional view of another shear mixing apparatus of this invention, as characterized by the second aspect mentioned above.
Figure 3:
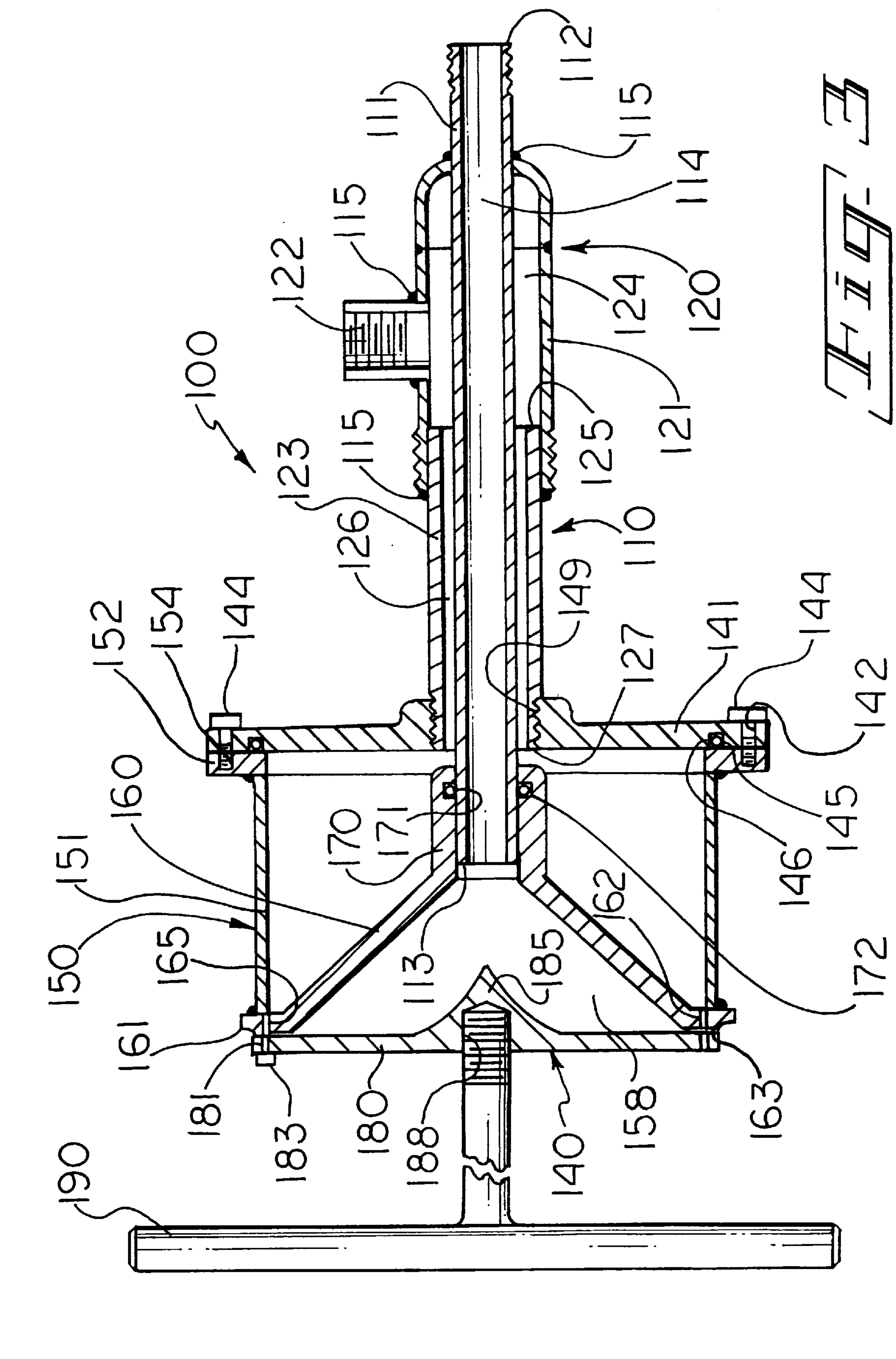
FIG. 3 is an axial schematic sectional view of a third embodiment of a shear mixing apparatus of this invention.
Figure 4:
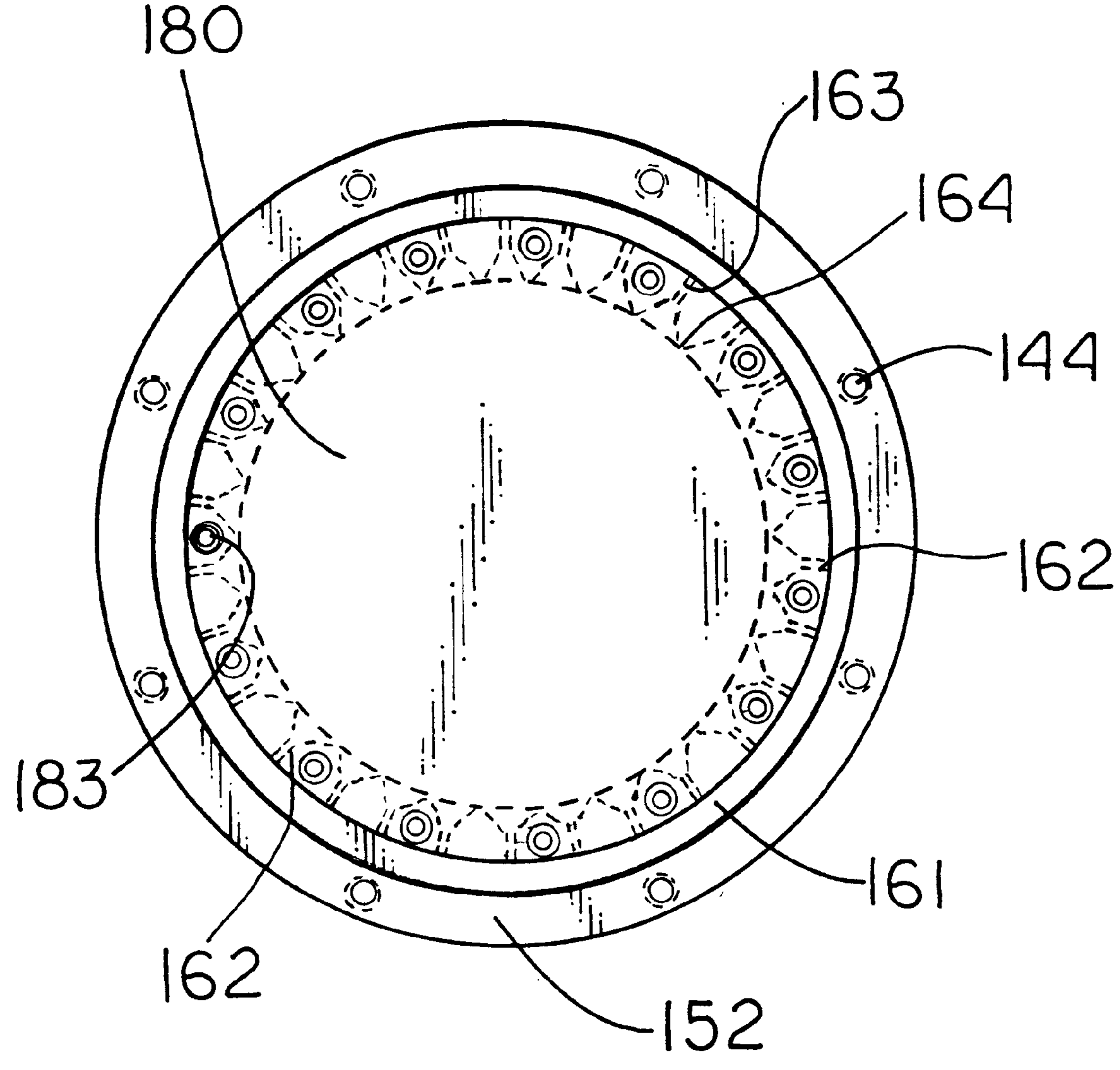
FIG. 4 is a top plan view of the apparatus of FIG. 3.
Figure 5:
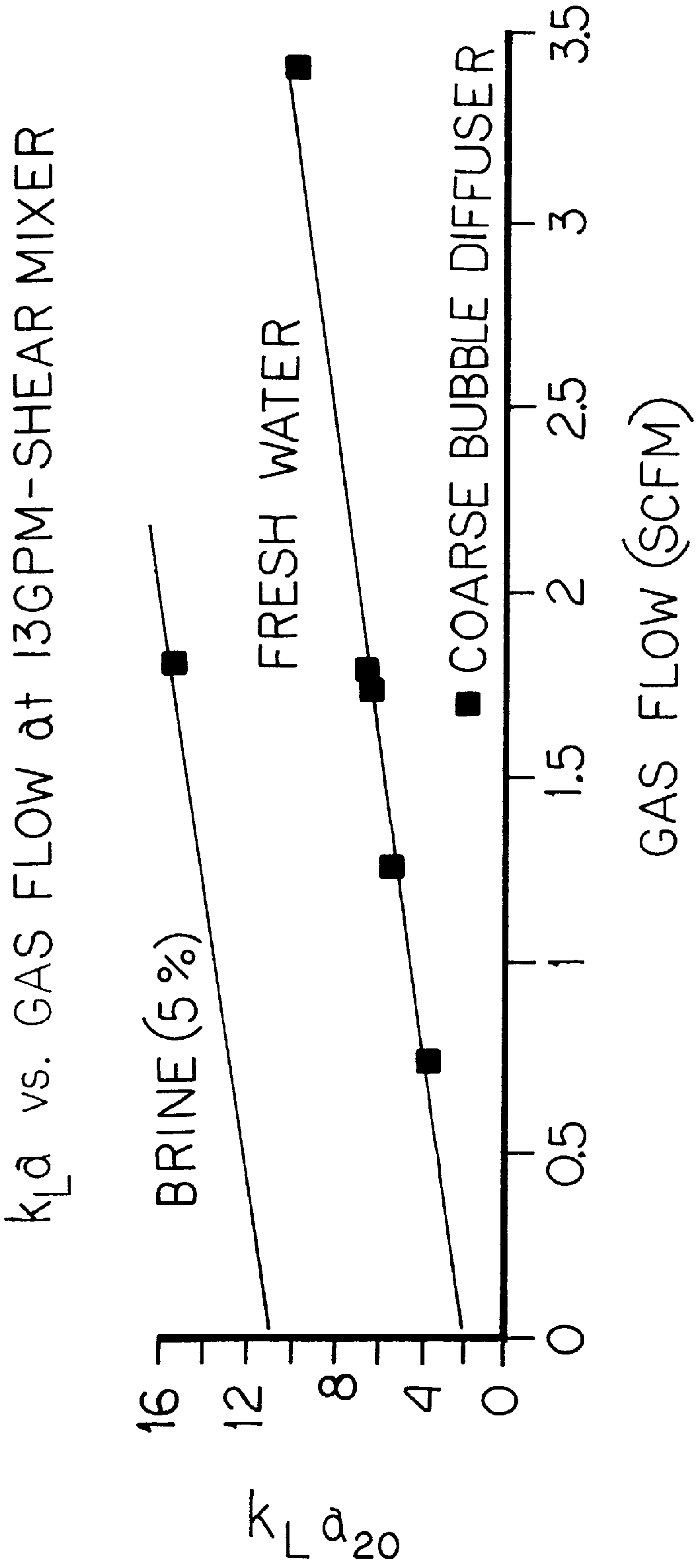
FIG. 5 is a graphic portrayal of data presented in Table I. Table I is a compilation of oxygen transfer testing results for Example 2. The vertical axis represents $k_L a_{20}$ and the horizontal axis represents gas flow rates in standard liters per minute (SLM).

Referring now to the drawings, FIGS. 1, 2 and 3 provide schematic views of three related apparatus that are representative of the present invention. FIG. 4 is another view of the apparatus shown in FIG. 3. The various apparatus are not drawn to scale and features such as size, location and number of apertures are illustrative rather than limiting.

FIG. 1 portrays a shear mixing apparatus generally designated by the reference numeral 10. Apparatus 10 comprises a hollow mixer body 11, a conduit 15 for carrying a first fluid to be mixed, a second fluid supply conduit 20 that contains passageway 21 and a plug 25.

Mixer body 11 has a first end 12 and a second end 13 that is distant from first end 12. Mixer body 11 encloses hollow space 30 between its first and second ends 12 and 13. Second end 13 has defined therein an aperture 14. A suitable shape for mixer body 11 (ignoring second fluid supply conduit 20 for purposes of visualization) is a hollow right circular cylinder that is open at one end (second end 13) and closed, save for an aperture at an end (first end 12) opposing the open end. When mixer body is so shaped and there is only one conduit 15, aperture 14 and conduit 15 are desirably coaxial with the mixer body's axis. When there are at least two conduits 15, the number of apertures 14 increases to match the number of conduits 15.

Plug 25 is fitted within mixer body 11 proximate to its second end 13. Plug 25, when so fitted, desirably has defined therein at least one aperture or orifice 26. Aperture 26 is desirably disposed so as to be coaxial with the mixer body's axis when there is only one conduit 15. When there are at least two conduits 15, each aperture 26 is preferably coaxial with a corresponding conduit 15.

The conduit 15 has a first end 16 and a second end 17 that is distant from first end 16. First end 16 is open and preferably connected to a source of a first motive fluid (not shown). Second end 17 is closed or capped so as to prevent the first motive fluid from exiting via that end. The conduit 15 passes through, and is fitted within aperture 14 of the first end 12 of mixer body 11. Fitting of the conduit 15 within aperture 14 is preferably accomplished in such a manner as to provide a substantially leak-proof, preferably gas-tight, seal about conduit 15 where it passes through aperture 14. Conduit 15 also passes through aperture 26 of plug 25. In doing so, conduit 15 and plug 25 combine to form a restricted orifice 27 in relation to the hollow space 30, in the form of a longitudinal annular space defined along a length of the conduit 15 at a location near second end 17. Within said length, the conduit 15 has defined therein a plurality of apertures 19. Each aperture 19 is in fluid communication with restricted orifice 27. The number, size, spacing and location of apertures 19 are sufficient to provide small bubbles when operated in accordance with the fourth aspect of the present invention.

Second fluid supply conduit 20 is operatively connected to mixer body 11 at a point intermediate between first end 12 and second end 13 of mixer body 11. When so connected, passageway 21 of second conduit 20 is in fluid communication with hollow space 30. If desired, one or more additional fluid supply conduits may be operatively connected to mixer body 11 in a like manner for providing additional fluids (gases or liquids, but preferably being liquids) to mixer body 11 for being combined with a gas (which may be a single gas or mixture of individual gases) or plurality of gases from a conduit 15 or conduits 15.

Turning now to FIG. 2, a shear mixing apparatus is portrayed according to the second aspect of the invention, and generally designated by the reference numeral 40. Apparatus 40 comprises a hollow mixer body 41, an aperture-bearing conduit 50, and a fluid supply conduit 60 that contains passageway 61.

Mixer body 41 has a first end 42 and a second end 43 that is distant from first end 42. Mixer body 41 encloses hollow space 55 between its first and second ends 42 and 43. First end 42 has defined therein an aperture 44. Second end 43 has defined therein an aperture 45. Each aperture 44 is preferably coaxial with an opposing aperture 45. A suitable shape for mixer body 41 (ignoring fluid supply conduit 60 for purposes of visualization) is a hollow right circular cylinder that is closed at both ends save for apertures 44 and 45. When mixer body is so shaped, each conduit 50 is preferably aligned so as to be coaxial with axes of a pair of opposed apertures 44 and 45.

Conduit 50 has a first end 51 and a second end 52 that is distant from first end 51. The conduit 50 passes through, and is fitted within apertures 44 and 45 of mixer body 41. Fitting of the conduit 50 within apertures 44 and 45 is preferably accomplished in such a manner as to provide a leak-proof, preferably gas-tight, seal about the conduit 50 where it passes through apertures 44 and 45. Because first end 42 and second end 43 are spaced apart from each other, mixer body 41 thereby encloses a length of the conduit 50. Within said length, conduit 50 has defined therein a plurality of apertures 54. Each aperture 54 is in fluid communication with hollow space 55. The number, size, spacing and location of apertures 19 are sufficient to provide small bubbles when operated in accordance with the fourth aspect of the present invention.

Fluid supply conduit 60 is operatively connected to mixer body 41 at a point intermediate between first end 42 and second end 43 of mixer body 11. When so connected, passageway 61 of conduit 60 is in fluid communication with hollow space 55. If desired, one or more additional fluid supply conduits may be operatively connected to mixer body 11 in a like manner, for supplying additional fluids to the mixer body 11.

A first motive fluid under pressure, desirably a gas such as air or oxygen, flows from a source (not shown) into the conduit 15 of apparatus 10 (shown in FIG. 1) by way of an operative connection to first end 16 of first conduit 15. The first motive fluid, of necessity, enters restricted orifice 27 via apertures 19 in conduit 15. A second motive fluid, desirably a liquid such as water or brine, flows from a source (not shown) into passageway 21 by way of an operative connection to second fluid supply conduit 20. The second motive fluid flows from passageway 21 into hollow space 30. When hollow space 30 fills with the second motive fluid, the fluid flows into and through restricted orifice 27. Restricted orifice 27 has a cross-sectional area that is less than that of hollow space 30, so that the second motive fluid has a velocity through orifice 27 that is greater than its velocity through passageway 21 and hollow space 30. The first motive fluid flowing through apertures 19 is under a pressure sufficient to substantially preclude the second motive fluid from entering the conduit 15 by way of apertures 19. The pressure is also sufficient to generate gas bubbles when the first motive fluid is a gas and the second motive fluid is a liquid. It is believed that the flow of the second motive fluid through orifice 27 is strong enough to overcome interfacial tension between the gas and liquid thereby forcing the bubbles to break up into smaller bubbles. If both motive fluids are gases or liquids, apparatus 10 is believed to facilitate mixing of the motive fluids. If the second motive fluid is a liquid and the first motive fluid is a gas that is miscible in the liquid, apparatus 10 is believed to promote dispersion of the miscible gas throughout the liquid.

Apparatus 40, shown in FIG. 2, suitably combines a first motive fluid, desirably a liquid, that flows through aperture-bearing conduit 50 with a second motive fluid, desirably a gas, that flows through passageway 61 of fluid supply conduit 60. Gases and liquids specified with regard to apparatus 10 also work for apparatus 40. The first motive fluid flows from a source (not shown) into the conduit 50 by way of an operative connection with first end 51 of conduit 50. With no change in cross-sectional area, there is substantially no variation in fluid flow rate as the first motive fluid flows through conduit 50. The second motive fluid flows into passageway 61 from a source (not shown) by way of an operative connection with fluid supply conduit 60. The second motive fluid flows from passageway 61 into hollow space 55 and, from there, via apertures 54 into conduit 50. The second motive fluid is under a pressure sufficient to generate bubbles and substantially preclude entry of the first motive fluid into hollow space 55. As with apparatus 10, the flow of a liquid motive fluid is desirably sufficient to cause subdivision of bubbles generated when a gaseous motive fluid passes through apertures and into contact with the liquid motive fluid. In addition, apparatus 40 is suitable for the same purposes as apparatus 10.

FIG. 3 portrays still a third, related embodiment of a shear mixing apparatus of the present invention, which is generally designated by reference numeral 100. Apparatus 100 comprises a hollow gas and liquid receiving subassembly 110, a bubble generating subassembly 140 and an optional handle 190. Handle 190, when present, facilitates installation of apparatus 100 into a vessel (not shown) such as a polymerization reactor or a bioreactor.

Receiving subassembly 110 comprises a central conduit 111 and gas receiving housing 120. Central conduit 111 has an open inlet end 112 and an outlet end 113 that is distant from first end 112, and in fluid communication with the bubble generating subassembly 140. Central conduit 111 has defined therein axial passageway 114 that is suitable for conveying liquids. Gas receiving housing 120 may preferably be comprised of a single structural element, or as shown in FIG. 3 may comprise an annular gas receiving chamber housing 121 and annular gas transport housing 123. Gas receiving chamber housing 121 has defined therein at least one gas receiving passageway 122. Passageway 122 is desirably internally screw threaded to facilitate a gas-tight connection to a source of gas (not shown). Gas receiving chamber housing 121 encloses hollow chamber 124 that is in fluid communication with gas receiving passageway 122. Annular gas transport housing 123 desirably functions in combination with at least a linear portion of central conduit 111 to form an elongated annular space 126 for communicating gas from the gas receiving chamber housing 121 to the bubble generating subassembly 140. Housing 123 has a first end 125 inserted into hollow chamber 124 and a second end 127 that is distant from first end 125. Housing 123 is preferably externally screw threaded proximate to its second end 127. Annular space 126 is also in fluid communication with hollow chamber 124 so that a first motive fluid (preferably a gas) which enters passageway 122 can flow into hollow chamber 124 and then through annular space 126. Components of receiving subassembly 110 are operatively connected to each other by suitable fastening means such as fillet welds 115.

Bubble generating subassembly 140 comprises base plate 141, gas and liquid distribution housing 150 and cover plate 180. Base plate 141 has defined therein a plurality of apertures 142. Base plate 141 also has defined therein annular sealing ring housing 145 that suitably contains sealing means 146. Sealing means 146, suitably an O-ring, functions to provide a generally gas-tight seal between base plate 141 and housing 150. Base plate 141 preferably has further defined therein a central or axial aperture 149. Aperture 149 is preferably internally screw threaded so that end 127 of housing 123 can be screwed into aperture 149 when bubble generating subassembly 140 and receiving subassembly are assembled as shown in FIG. 3.

Distribution housing 150 comprises, in operative combination, outer wall 151 and central fluid expansion housing 160. Housing 160 is desirably in the shape of a funnel (a utensil that is commonly comprised of a hollow frustoconical element with a tube or hollow stem extending from the smaller end of the element) with a hollow stem 170 and an outwardly projecting peripheral extension 161 from the stem 170 toward cover plate 180. Peripheral extension 161 preferably extends outward from where it operatively connects, preferably by a continuous fillet weld or other satisfactory bonding means, to outer wall 151. Hollow stem 170 has defined therein an internal annular space 171. Annular space 171 suitably contains a sealing means 172, suitably an O-ring, to provide a generally gas-tight and fluid-tight seal when stem 170 is slidably fit over a linear segment of central conduit 111 proximate to second end 113 of conduit 111.

Outwardly projecting peripheral extension 161 has defined therein a plurality of apertures 162. Extension 161 also has defined therein a plurality of fluid channels 163. Each fluid channel 163 is separated from adjacent fluid channels 163 by fluid diverters 164 (shown in FIG. 4). Extension 161 further has defined therein a plurality of apertures 165. Apertures 165 desirably pass through fluid diverters 164 (see FIG. 4) and are preferably internally screw-threaded.

The operative combination of outer wall 151 and central fluid expansion housing 160 encloses a hollow space 143. Hollow space 143 is in fluid communication with apertures 162 and, when apparatus 100 is assembled as shown in FIG. 3, elongated annular space 126.

Outer wall 151 desirably terminates in a flange 152. Flange 152 is spaced apart from outwardly-projecting peripheral extension 161. Flange 152 has defined therein a plurality of apertures 154. Apertures 154 are preferably internally screw threaded and aligned with corresponding apertures 142 in base plate 141. Outer wall 151 is operatively connected to base plate 141 by suitable fastening means such as cap screws 144.

Cover plate 180 has defined therein a plurality of apertures 181. Apertures 181 are desirably axially aligned with corresponding internally screw threaded apertures 165 in outer lip 161. Cover plate is desirably fastened to distribution housing 150 by fastening means 183 such as cap screws that are operatively connected by way of apertures 181 and 165. Cover plate 180 desirably has defined therein a central axial fluid diverter 185. Diverter 185 is desirably in the shape of a cone with an apex that projects toward, and is in axial alignment with, the axis of central conduit 111 when apparatus 100 is assembled as shown in FIG. 3.

Cover plate 180 and central fluid expansion housing 160, when assembled, define a hollow fluid distribution space 158. Cover plate 180 and expansion housing 160 also enclose fluid channels 163. Distribution space 158 is in fluid communication with fluid channels 163 and central conduit 111 when apparatus 100 is assembled as shown in FIG. 3.

When handle 190 is to be employed, cover plate 180 also has defined therein central aperture 188. Aperture 188 is desirably internally screw threaded to accommodate an externally screw threaded handle for ease of installation.

FIG. 4 shows a top plan view of distribution housing 150. Apertures 162 are shown in alignment with fluid channels 163. Fluid channels 163 are separated by fluid diverters 164, suitably shaped like saw teeth.

Apparatus 100 conveys a second motive fluid (preferably a liquid) from a source (not shown) through central conduit 111 into distribution space 158 and then into fluid channels 163. Simultaneously, apparatus 100 conveys a first motive fluid (preferably a gas) from a source (not shown) through passageway 122, chamber 124, annular passage 126 and into chamber 143 from which it exits via apertures 162. The motive fluids and utilities described for apparatuses 10 and 40 apply equally well to apparatus 100.

The motive fluid velocities or linear (as opposed to volumetric) flow rates are preferably selected in conjunction with an apparatus, apparatus 10, apparatus 40, apparatus 100 or a variation of any of them, in order to attain a Weber number that exceeds a critical Weber number for a desired bubble diameter or size for the particular gaseous and liquid motive fluids that enter the apparatus. Skilled artisans can select a suitable apparatus and determine satisfactory operating conditions without undue experimentation. Skilled artisans can also determine suitable modifications of any apparatus described herein without undue experimentation or exceeding the spirit and scope of the present invention.

Apparatus within the scope of the present invention, such as those depicted in FIGS. 1, 2 and 3, are useful in a wide variety of applications. Illustrative, non-limiting uses include improving mass transfer of oxygen or air into water used in bioreactors that treat waste water streams, improving the performance of oxygen-activated polymerization inhibitors in one or more stages of a polymerization reaction and generally, improving the miscibility of at least one gas in a liquid. An example of a commercially-significant use of the mixing apparatus of the present invention in this last regard, would be in the production of polycarbonates in a solution process or in an interfacial process particularly, wherein a gaseous carbonic acid derivative such as phosgene is reacted with a dihydroxy compound such as the aromatic dihydroxy compound 2,2-bis(4-hydroxyphenyl)propane (commonly, "Bisphenol-A") in a homogeneous solution containing the Bisphenol-A and phosgene (the solution process), or in a two-phase system wherein the Bisphenol-A is dissolved or suspended in an aqueous solution of an organic base and an organic solvent (methylene chloride, for example) which is capable of dissolving the polycarbonate oligomer product of the reaction of phosgene and Bisphenol-A is also present (the interfacial process). Various batchwise and continuous processes and arrangements of unit operations, involving both plug-flow and continuous stirred tank reactors, have been described in the art or are known, see, for example, U.S. Pat. Nos. 4,737,573 and 4,939,230 and the various references cited therein. Those skilled in the polycarbonate art will appreciate that the shear mixing apparatus of the present invention may be appropriately and desirably used in many of these processes for improving the flow regimes established therein, and with regard to those known interfacial processes wherein phosgene is bubbled into the process with the methylene chloride organic solvent, for example, will beneficially improve the dispersion of the phosgene into the methylene chloride.

In a further general aspect, it will be apparent to those skilled in the art that the present invention in both its apparatus and method aspects is useful in reducing the reaction time, and thus in reducing either the number or size of reaction vessels required to produce a predetermined amount of a product (correspondingly reducing the cost to make the product) or in potentially enabling additional product to be made from existing reactors and processes, for any kinetically fast-reacting gas-liquid reactive system that is mass-transfer limited. Many oxidation and hydrogenation processes fall into this category, as will be readily appreciated.

For example, the oxidation processes to produce ethylbenzene hydroperoxide and t-butyl hydroperoxide, which are intermediates in known commercial processes for respectively co-producing propylene oxide and styrene on the one hand and propylene oxide and tert-butyl alcohol on the other, involve significant reaction times (on the order of from 1 to 4 hours, see "Propylene Oxide", Kirk-Othmer Encyclopedia of Chemical Technology, 3rd Edition, vol. 19, pp. 257–261 (1982)) and may require multiple reactor vessels. In this regard, t-butyl hydroperoxide conventionally is prepared via the liquid phase air oxidation of isobutane in the presence of from 10–30 percent of tert-butyl alcohol, at a temperature of from 95 to 150 degrees Celsius and a pressure of from 2075 to 5535 kPa, in a conversion of 20 to 30 percent of the isobutane and a selectivity to TBHP of 60 to 80 percent and to TBA of 20 to 40 percent. Unreacted isobutane and a portion of the TBA produced are separated from the product stream and recycled back to the hydroperoxide forming reactor, see also U.S. Pat. No. 4,128,587. Ethylbenzene hydroperoxide also is prepared by a liquid phase oxidation, in this case of ethylbenzene by air or oxygen at 140 to 150 degrees Celsius and 30 to 30 psia (206–275 kPa, absolute). Conversion to the hydroperoxide is reported to be 10 to 15 percent over a reaction time of from 2 to 2.5 hours, see also U.S. Pat. Nos. 3,351,635; 3,459,810 and 4,066,706.

One additional commercially significant application concerns the manufacture of epoxides via the corresponding olefin chlorohydrins, for example, epichlorohydrin from allyl chloride, butylene oxide via butylene chlorohydrin and propylene oxide via propylene chlorohydrin. Thus, in a broad sense, the present invention enables a more effective process for making epoxides, or, as just mentioned above, still more broadly facilitates other two phase, gas-liquid reactive processes where some benefit may be gained by improving the mass transfer of the gas into the liquid.

With particular regard for the production of epoxides via an olefin chlorohydrin intermediate, conventionally this is accomplished by formation of the olefin chlorohydrin and thereafter contacting the chlorohydrin with an aqueous alkali metal hydroxide in an epoxidation step, to form an aqueous salt solution product containing at least one epoxide. The apparatus and method of the present invention (as further explained below) are especially suited to aiding in and improving the formation of the olefin chlorohydrin.

The olefin chlorohydrin is, in this respect, preferably formed by contacting a low chlorides aqueous hypochlorous acid (HOCl) solution with at least one unsaturated organic compound to form an aqueous organic product comprising at least one olefin chlorohydrin. The "unsaturated organic compound" may contain from 2 to about 10 carbon atoms, preferably 2 to 8 carbons, and more preferably 2 to 6 carbons. The organic compound is selected from a group consisting of substituted and unsubstituted olefins and may be linear, branched, or cyclic, preferably linear. Suitable olefins include amylenes, allene, butadiene, isoprene, allyl alcohol, cinnamyl alcohol, acrolein, mesityl oxide, allyl acetate, allyl ethers, vinyl chloride, allyl bromide, methallyl chloride, propylene, butylene, ethylene, styrene, hexene and allyl chloride and their homologues and analogs. Propylene, butylene, ethylene, styrene, hexene and allyl chloride are the preferred olefins; with propylene, butylene, and allyl chloride more preferred and propylene most preferred. The olefin is preferably unsubstituted, but may also be inertly substituted. By "inertly" it is meant that the olefin is substituted with any group which does not undesirable interfere with formation of the chlorohydrin or the epoxide. Inert substituents include chlorine, fluorine, phenyl, and the like. Additional more detailed descriptions of an epoxidation process and an associated chlorohydrin forming step of the type summarized herein may be found in commonly-assigned U.S. Pat. Nos. 5,486,627 and 5,532,389 (which are incorporated herein by reference).

Although the preferred embodiment of this method and of the incorporated patents involves the use of low chlorides aqueous HOCl solutions, those skilled in the art will easily recognize the method also applies to use of hypochlorite solutions, typically in the presence of stoichiometric amounts of chloride, and also to use of chlorine gas partially or wholly dissolved in water.

For optimum results, the organic compound is typically added in an amount sufficient to provide a molar ratio of organic compound to low chlorides HOCl of greater than about 0.8. To insure complete reaction of the HOCl, the amount of organic compound is advantageously provided in at least about a stoichiometric amount. Preferably from about 0 to about 25 mole percent of excess organic compound is provided, and more preferably from about 0 to about 10 mole percent excess organic compound is fed to the reactor. Unreacted organic compound may then be recycled back to contact with the HOCl. A skilled artisan is fully capable of employing various known methods of recycling unreacted organic compounds when the compounds are supplied in excess of that needed for the reaction.

The incoming feed of low chlorides aqueous HOCl is typically provided in a concentration of from about 1.0 to about 10 wt %, preferably from about 2 to about 7 wt %, based on HOCl in water. This provides a good balance between water requirements and inhibition of by-product formation.

The organic compound may be contacted with the HOCl solution by any method sufficient to form the chlorohydrin. This is typically accomplished by introducing the organic compound and the HOCl solution into a reactor in a manner so as to allow maximum uniformity of all of the reactor's contents. Preferably, the contact of the HOCl solution and the organic compound occurs in either a continuous or semi-continuous reactor. In a continuous reactor, such as a continuous tubular reactor, reactants are introduced and products withdrawn simultaneously. In contrast, an example of a semi-continuous reactor would be a reactor having a specific amount of organic compound already placed in the reactor, then having a continuous feed of the HOCl solution fed to the reactor, producing chlorohydrin products which accumulate in the reactor. It is more preferred that the contact occur in the presence of mixing in a continuous reactor such as a plug flow reactor or a backmix reactor. A plug flow reactor is one in which reactants are introduced at one end and products withdrawn at the other end with little backmixing along the reactor, for example, a continuous tubular reactor. A backmix reactor is defined as a reactor in which reaction products are intimately mixed with feed materials, resulting in uniform product and reactant concentrations throughout the reaction vessel. An example of a continuous reactor of this type is a continuous-flow stirred tank reactor (CSTR).

Conditions of temperature, pressure and reaction time are not critical. Any conditions under which the HOCl and the organic compound react are suitably used. The HOCl solution is advantageously fed to the reactor at a temperature of about 30–60° C., preferably about 40° C. Conveniently, the temperature of the HOCl/organic compound reaction is at least about 40° C. because lower temperatures require refrigeration or other cooling. More preferably, the reaction temperature is at least about 60° C. Preferably, the temperature is less than about 100° C., more preferably less than about 90° C. (to avoid vaporization of the water and organic compounds in the reactor), and most preferably less than about 80° C. (to avoid undesirable increases in by-product formation occurring above this temperature).

When a plug flow reactor is used, the olefin gas is introduced into the HOCl solution through a tube perpendicular to the flow of the HOCl solution. The design of the shear mixing apparatus of the present invention is in this context such that the liquid superficial velocity is at least about 15 feet/second (4.6 m/sec), preferably at least about 22 ft/sec (6.7 m/sec), more preferably at least about 30 ft/sec (9.1 m/sec) and less than about 100 ft/sec (30.5 m/sec), preferably less than about 50 ft/sec (15.2 m/sec). The gas superficial velocity once introduced into the liquid stream is at least about 3 ft/sec (0.9 m/sec), preferably at least about 6 ft/sec (1.8 m/sec) and less than about 30 ft/sec (9.1 m/sec), preferably less than about 20 ft/sec (6.1 m/sec). The ratio of liquid superficial velocity to gas superficial velocity is at least about 1.0, preferably at least about 1.5 and is less than about 10, preferably less than about 8. To meet these conditions, more than one of the inventive shear mixing apparatus may be required as the volume of gas is typically greater than the volume of liquid. When multiple apparatus are used, sufficient spacing is provided between the apparatus such that at least about 80 percent, preferably at least about 90 percent of the organic is reacted before introducing additional organic to the liquid stream.

Use of a CSTR as the reactor allows the use of higher liquid volumetric flows through the shear mixing apparatus by use of a recycle line that removes liquid from the reactor, passes it through the mixing apparatus and returns it to the reactor vessel. In this operation the fresh HOCl solution is either mixed with the recycle stream before the inventive shear mixer or is introduced to the CSTR vessel through a separate line. The CSTR vessel is optionally additionally provided with a supplemental conventional mixing means that maintains a uniform distribution of reactants and products within the vessel, such as a conventional mechanical agitator. The design of the inventive shear mixing apparatus in this particular configuration is such that the liquid superficial velocity is at least about 15 feet/second (4.6 m/sec), preferably at least about 22 ft/sec (6.7 m/sec), more preferably at least about 30 ft/sec (9.1 m/sec) and less than about 100 ft/sec (30.5 m/sec), preferably less than about 50 ft/sec (15.2 m/sec). The gas superficial velocity once introduced into the liquid stream is at least about 3 ft/sec (0.9 m/sec), preferably at least about 6 ft/sec (1.8 m/sec) and less than about 30 ft/sec (9.1 m/sec), preferably less than about 20 ft/sec (6.1 m/sec). The ratio of liquid superficial velocity to gas superficial velocity is at least about 1.0, preferably at least about 1.5 and is less than about 10, preferably less than about 8. Although only one inventive apparatus is typically required to meet these requirements, it is contemplated that additional apparatus may be desirably employed depending on reactor geometry and the size of shear mixing apparatus so employed.

In the most preferred embodiment where a CSTR is used, the CSTR operates isothermally, whereas a plug flow type reactor commonly operates adiabatically. The heat of reaction is, therefore, advantageously removed from a CSTR such as by a recycle heat exchanger and/or a reactor jacket. To minimize the external heating or cooling on the reactor, the heat of reaction is preferably matched with raw material feed temperatures such that the heat of reaction raises the feed temperatures to the desired reaction temperature. Matching the temperatures is within the skill in the art. For example a one molar HOCl feed concentration (about 5 weight percent HOCl) reacted with propylene adiabatically raises the temperature about 55° C. Therefore, if a reaction temperature of about 90° C. is desired, the feed temperature is advantageously about 35° C. A lesser spread between feed temperature and reaction temperature requires cooling, while a greater spread in temperatures requires heating. The temperature control is achieved by any means within the skill of the art, such as a jacketed reaction vessel, submersible coils in the reactor, or a heat exchanger in an external recycle line.

Conveniently, the pressure is at least about atmospheric (about 101 kPa), preferably at least about 2 atmospheres (202.6 kPa). The higher pressures also enhance the mass transfer of the organic compound with the HOCl solution, increasing the overall reaction rate. Conveniently, the pressure is less than about 150 psig (1037 kPa) gauge, and more preferably is less than about 100 psig (691 kPa) gauge, because the lower pressure requirements reduce the fabrication costs of the reactor and reduce energy costs for introducing the gas into the reactor.

The reaction time for the chlorohydrin forming step varies depending upon such factors as reactants used, reaction temperature, desired conversion level, liquid to gas volumetric ratio through the shear mixer of the present invention, excess organic compound, reactor pressure, chlorides level in the HOCl feed, and HOCl feed concentration. One skilled in the art is capable of determining a sufficient time required for reaction of the HOCl with the organic compound. For example, when propylene is used as the organic compound in a CSTR, and under the above described most preferred conditions, reaction time can desirably be reduced to as little as about two minutes and more preferably to as little as about 1 minute. Conveniently, the reaction time is less than about 10 minutes and more preferably less than about 5 minutes in order to minimize the size of the reactor vessel needed to produce a preselected amount of product. The reaction of allyl chloride is faster than propylene and thus requires less reaction time, while reaction of butylene or hexene is slower than propylene and requires longer reaction times.

Conversion of HOCl in the CSTR is advantageously at least about 90 mole percent and preferably greater than about 98 mole percent, such that the HOCl concentration in the reactor, diluted by water from reacted HOCl solution, does not exceed 0.2 wt %, and is preferably less than 0.1 wt %. Lower conversion levels result in higher yields of chlorinated ketones, such as monochloroacetone (MCA), from oxidation of the product chlorohydrin, such as propylene chlorohydrin (PCH) and other undesirable by-products. Advantageously, conversion is less than about 99.8 mole percent in the CSTR; higher conversions, though possible, require longer residence times, and thus, larger equipment to produce a preselected amount of product.

Figure 7:
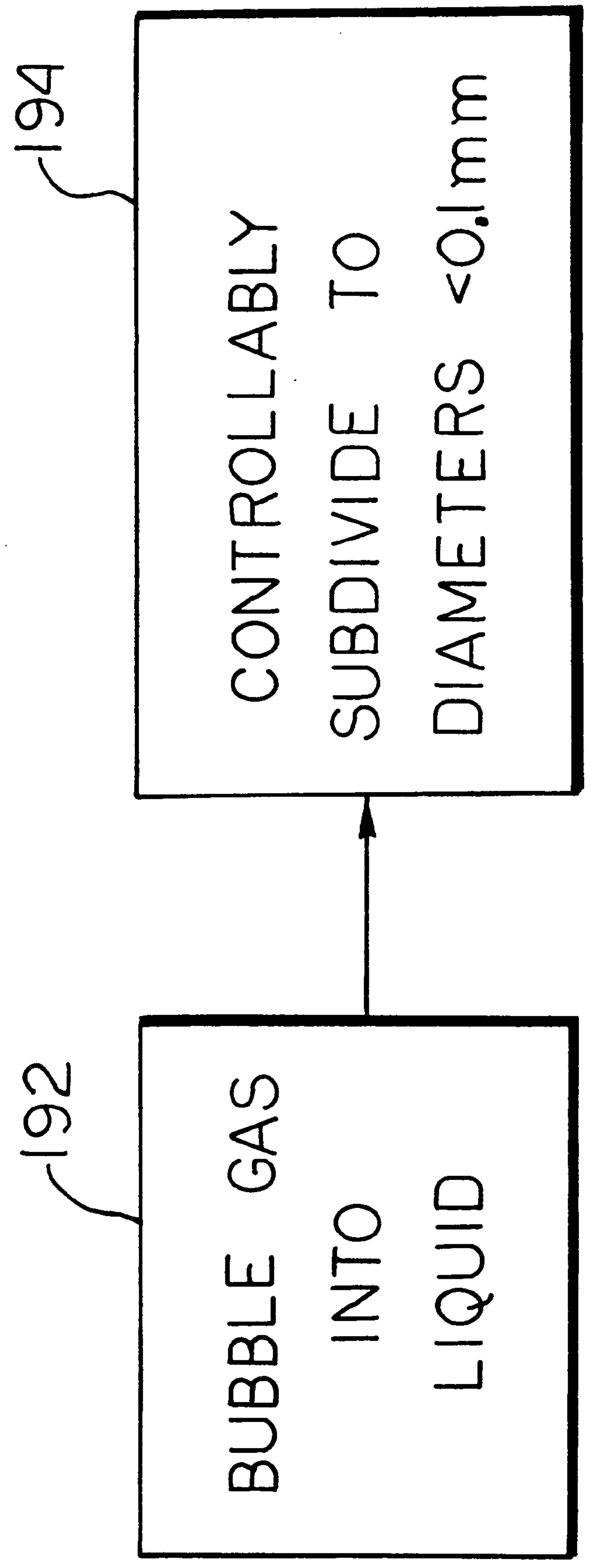
FIG. 7 schematically illustrates a bubble generating method according to the present invention.

The method aspect of the present invention, in keeping with the findings and expressed needs of the Motarjemi and Jameson references mentioned in introduction of the present invention and with the gas-liquid applications just mentioned, accordingly is concerned with generating small gas bubbles in a liquid. The bubbles preferably have a diameter of less than about one tenth of a millimeter (mm). Apparatuses within the scope of the present invention are particularly suitable for use in the method aspect. As schematically shown in FIG. 7, the method comprises two separate actions that serve to bring a gas into contact with a flowing liquid. One action (indicated as step 192) places the gas under a pressure that is sufficient to generate gas bubbles when a gas is introduced into a liquid, preferably a flowing liquid, by way of at least one aperture in an element or member otherwise separating the gas from the liquid. The other action passes a flowing liquid past the aperture(s) at a rate of linear flow sufficient to provide a Weber number that exceeds a critical Weber number for a desired bubble size, taking into account the physical properties of the gas and liquid. As a practical matter, this rate of flow promotes at least one subdivision of the bubbles initially produced at the aperture. The subdivision induced in the step 194 effectively leads to the generation of small bubbles having the desired diameter of less than 0.1 mm.

The method of the present invention thus effectively enables control of the size of gas bubbles that are generated in a liquid. Apparatuses 10, 40, 100 and variations thereof are preferably used in conjunction with the method. Bubble size control leads, in turn, to management of mass transfer from the gas to the liquid by way of determining the surface area available for such mass transfer.

A dimensionless number, called the Weber number, is used to predict a relationship between size of bubbles generated and the flowing liquid. G. J. Jameson, in "Bubbles in Motion", refers, at page 588, to earlier work by D. A. Lewis and J. F. Davidson, "Bubble Splitting in Shear Flow", Trans. IChemE, Vol. 60, pages 283–291 (1982). Jameson states that Lewis and Davidson used "critical Weber number" or Wecrit, to describe a critical ratio of forces that seek to split or subdivide a bubble to surface tension forces that seek to maintain a given bubble size or, if strong enough, to restore a bubble to a larger size. Exceeding the critical Weber number causes bubble splitting.

The present invention uses a shear field created by fluid flowing past an aperture from which a bubble is initially generated to control bubble size. If the flowing fluid has sufficient velocity, the shear field will be large enough to exceed the critical Weber number and the bubble will divide. Bubble division will continue until the resulting bubbles are of a size that satisfies the critical Weber number. The Weber number is defined by the following equation:

$$We=r*u^2*d_m/s$$

where:

r=the liquid density u=the velocity of the fluid in the shear field $d_m$=the bubble diameter s=the interfacial tension between the phases The present invention is useful with liquids which may be either a coalescing liquid, such as fresh water, or a noncoalescing liquid, such as a brine wastewater as produced from certain industrial processes, or a monomer stream which may be either coalescing or noncoalescing, for example, depending upon factors such as hydrogen bonding. "Coalescing", as used herein, means that bubbles, once generated, tend to merge together relatively rapidly into larger bubbles. "Noncoalescing", as used herein, means that bubbles, once generated, tend to remain as distinct bubbles that retain their size.

The monomer stream or feedstream suitably contains a polymerization inhibitor that is activated by the gas. Alternatively, the gas could be a reactant in a polymerization reaction where efficient mass transfer of the gas to the liquid is desired. As still another example, the gas could be one that is miscible in the liquid.

In practical applications, such as the above-mentioned aeration of waste water that contains brine, enhancing the mass transfer of oxygen into the brine-containing waste water increases biochemical reaction rates. In other words, oxygen utilization increases as mass transfer rates are improved. The method and apparatuses of the present invention, by generating smaller bubbles than conventional bubble generators, effectively improve mass transfer.

Figure 6:
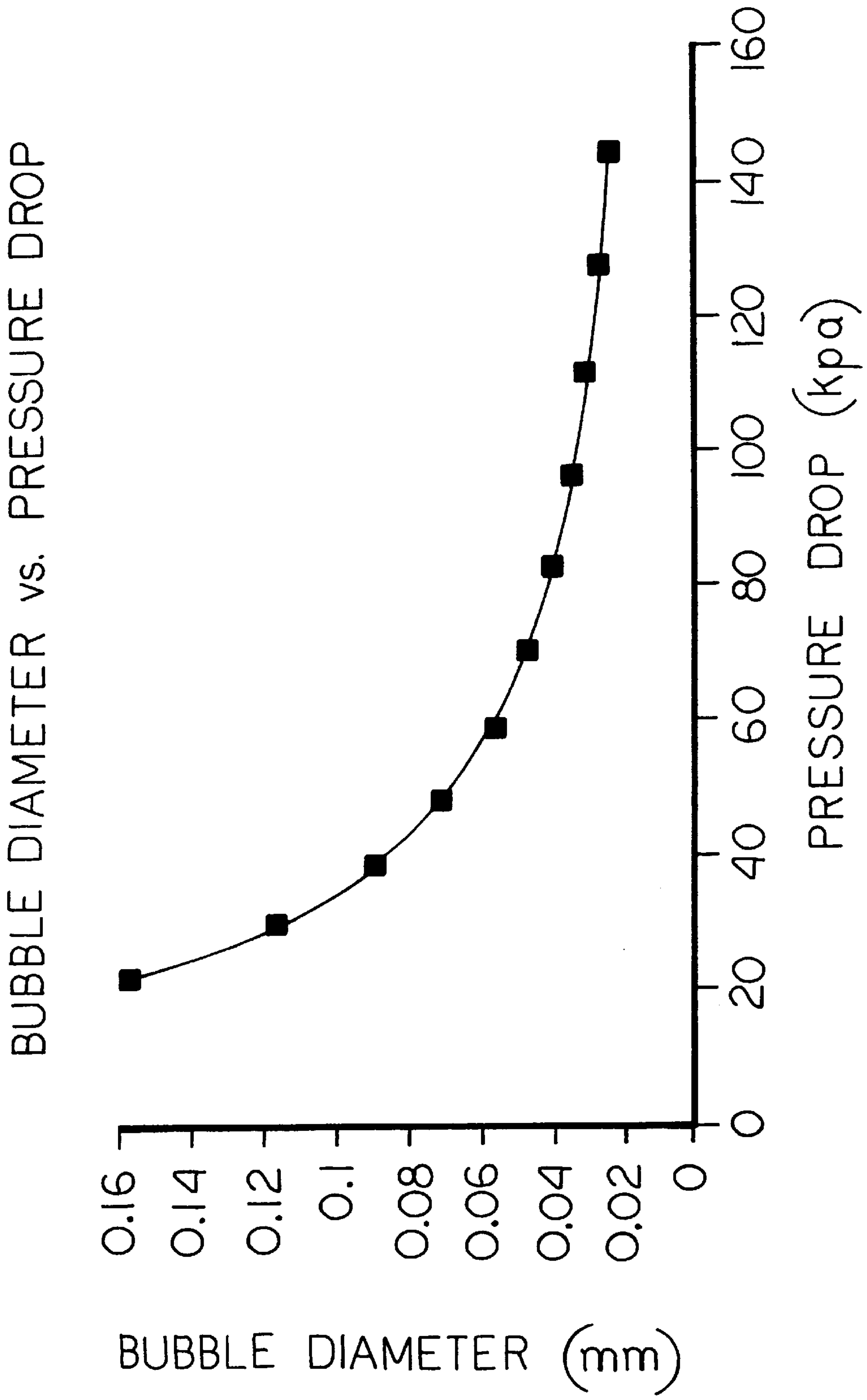
FIG. 6 is a graphic illustration of pressure drop or energy expended (in kilopascals) to attain a given bubble diameter using conventional shear mixing technology.

The improvement comes about through expenditure of energy to create a shear field. The energy expenditure is proportional to the pressure drop across a mixing conduit and the square of the velocity of the liquid. A practical point of diminishing returns on energy expenditure versus bubble size occurs within a range of from about 50 to about 70 kilopascals (kPa), as illustrated in FIG. 6. Even though surface area for mass transfer continues to increase with increasing energy expenditures, energy costs may outweigh the benefits realized by mass transfer increases. A break point for determining where energy costs become uneconomical will vary depending upon the end use application of choice. In other words, an end use such as promoting the effectiveness of an oxygen-activated polymerization inhibitor may tolerate greater energy costs than waste water treatment.

The following examples further define, but do not limit the scope of the invention. Unless otherwise stated, all parts and percentages are by weight.

EXAMPLE 1

The process according to the invention was carried out in a 6 inch by 6 inch (15.2 by 15.2 centimeter (cm)) cross section, 36 inch (91.4 cm) tall rectangular acrylic tank. The tank was filled to a level of 29.7 inches (75.4 cm) with a 10% by weight solution of NaCl in water. The tank had an open top, and the temperature was 68 degrees Fahrenheit (° F.) (20 degrees Celsius (° C.)).

The two-phase mixing device employed in this Example was similar to the one depicted in FIG. 1. It consisted of a ⅜ inch (0.9 cm) outer diameter (OD) stainless steel inner air conduit (15) which was closed at one end, and which had three 1/64 inch (0.04 cm) holes drilled at a 120 degree spacing, ⅜ inch (0.9 cm) from the closed end. The outer two-phase mixer body portion consisted of a ⅜ inch (0.9 cm) PVC pipe nipple which had been machined out to 0.423 inch (1.1 cm) inner diameter (ID). The rest of the device consisted of a ½ inch (1.3 cm) PVC pipe tee, a stainless steel ½ inch (1.3 cm) male pipe thread to ⅜ inch (0.9 cm) tubing connector which was drilled out to pass the ⅜ inch (0.9 cm) tube, and two ½ inch (1.3 cm) to ⅜ inch (0.9 cm) pipe bushings. One of the bushings was connected to one of the run ends of the tee and the ⅜ inch (0.9 cm) pipe nipple was attached to the bushing. The pipe to tubing connector was connected to the other run end of the tee and the ⅜ inch (0.9 cm) tube inserted through the connector, closed end first until the tip of the tube was just past the end of the nipple, leaving the three 1/64 inch (0.04 cm) holes just inside the nipple.

The two-phase mixing device was connected to a ½ inch (1.3 cm) female pipe thread port at the center of the tank bottom using the second bushing, so that the mixer discharged vertically upwards into the tank. The discharge piping from a March TE-5C-MD centrifugal pump was connected to the remaining port of the tee. This pump's suction piping was connected to a ½ inch (1.3 cm) female pipe thread port in the bottom corner of the tank. A Wallace and Tiernan model 5120M12333XXL Varea-Meter flowmeter was positioned in the discharge piping to measure liquid flow rate. An air supply tube was connected to the ⅜ inch (0.9 cm) tube and the air flow rate was measured with a Matheson mass flow transducer with a Matheson Multiple Flow Controller model 8274.

The liquid flow rate was 1.75 gallons per minute (GPM) ($11\times10^{-5}$ cubic meters per second ($m^3$/sec)) and the air flow rate was 1.235 standard liters per minute (SLM). At these flow rates, the tank was filled with small bubbles and had a milky, nearly opaque appearance.

A ⅛ inch (0.3 cm) thick black rubber sheet was hung from the top of the tank and extended down into the tank about one and one half feet (0.46 meters (m)) below the liquid level. This sheet was positioned within a few millimeters (mm) of the front wall of the tank, creating a backdrop that made it possible to view individual bubbles in this shallow field. A video camera with a microscope attachment was used to videotape a small area just inside the acrylic wall of the tank. A 1 mm grid printed on a transparency was taped to the tank and was also videotaped in order to calibrate the microscope magnification.

The videotape was viewed using a video cassette recorder (VCR) with a Jog/Shuttle feature, so that individual frames of the videotape can be analyzed. The bubbles shown on the frames of videotape were measured on the screen of a video monitor using a millimeter scale. The frames of videotape showing the 1 mm grid were also viewed in this way and the grid divisions measured on the same monitor. This established that the magnification was about 60 to one (1.0 mm measured=0.0154 mm actual size).

Twenty bubbles ranging in size from 0 to 0.046 mm were observed on one frame along with ten ranging in size from 0.047 to 0.154 mm, four ranging in size from 0.155 to 0.231 mm, and three ranging in size from 0.232 to 0.385 mm. The smallest bubble possible to measure was 0.0154 mm and the largest bubble observed in the frame was 0.385 mm.

EXAMPLE 2

Oxygen transfer testing was performed according to the American Society of Civil Engineers (ASCE) clean water non-steady state procedure ("A Standard for the Measurement of Oxygen Transfer in Clean Water." Amer. Soc. of Civil Eng., New York, N.Y. (1984)) on a shear mixing device designed for brine waste waters and constructed in the manner of the apparatus shown in FIG. 2. Results of testing together with comparable data for a known, commercially-available coarse bubble diffuser are shown in Table I:

TABLE I

| Run No. | Diffuser Type | Air Flow (SLM/SCFM) | Water Flow (liters per min/gallons per min.) | $k_La_{20}$ (1/hours) | SAE* (lb $O_2$ HP/hour) |
|---|---|---|---|---|---|
| 1 | Coarse Bubble Diffuser** | 50.9/1.7 | 0 | 1.6 | 1.7 |
| 2 | Shear Mixer | 22.4/0.75 | 49.2/13 | 3.3 | 2.6 |
| 3 | Shear Mixer | 38.9/1.3 | 49.2/13 | 5.1 | 2.5 |
| 4 | Shear Mixer | 50.9/1.7 | 49.2/13 | 6.2 | 2.5 |
| 5 | Shear Mixer | 53.9/1.8 | 49.2/13 | 6.3 | 2.5 |
| 6 | Shear Mixer | 101.8/3.4 | 49.2/13 | 9.7 | 1.8 |
| 7 | Shear Mixer (5% Brine) | 53.9/1.8 | 49.2/13 | 15.4 | 5.7 |

*SAE = Standard Aeration Efficiency in pounds of oxygen per horse power per hour.
**Not an example of the invention.

For purposes of a direct comparison between the shear mixer and the coarse bubble diffuser, alpha values (defined as the ratio of $k_La$'s for two tested systems) were used. In this case, a standard or reference state was Run 1 for fresh water with the coarse bubble diffuser (CBD). Using Runs 1 and 4, alpha $=k_La_{20}$ shear mixer (Run 4)/$k_La_{20}$ CBD (Run 1)=3.9, in fresh water. Using Runs 1 and 7, alpha=$k_La_{20}$ shear mixer (Run 7)/$k_La_{20}$ CBD (Run 1)=9.6, in 5% brine.

The data presented in Table I demonstrate the effectiveness of the present invention relative to a conventional coarse bubble diffuser. An alpha value greater than unity (1.0) indicates a more effective mass transfer for the shear mixer relative to the coarse bubble diffuser. It is believed that the increase in mass transfer stems, at least in part, from an increased surface area. The increased surface area is due largely to an average bubble size for the shear mixer that is smaller than a typical average bubble size for a coarse bubble diffuser. The alpha value for the brine test solution (Run number 7) suggests that mass transfer improvements relative to a coarse bubble diffuser in fresh water (Run number 1) are due, at least in part, to the noncoalescing nature of the liquid. In other words, the bubbles, once formed, tend to retain their identity rather than merge or coalesce with other bubbles.

EXAMPLE 3

Summary of Gas/Liquid Shear Mixers Installed in Monomer Processing

To eliminate free radical polymer formation in the first seven stages of a ten-stage reactor, seven of the inventive gas/liquid shear mixers were installed, one in each stage, to improve the dispersion of air in the reaction mixture. The shear mixers were like that shown in FIG. 2 (Apparatus 40) save for having only one aperture 54 in first conduit 50. The oxygen in air activated a free radical inhibitor in this system. Before the installation of these shear mixers, polymer was present in stages 1 through 10, and approximately 0.5 cubic feet (0.014 $m^3$) of polymer was collected by filtration every 8 hours. The gas/liquid shear mixers operated with 11.5 SLM air flow rate and 1.0 gallons per minute ($6.3\times10^{-5}$ $m^3$/sec) solvent flow rate. The shear mixers had an orifice diameter of 3⁄16 inch (0.5 cm) and an orifice length of 1 inch (2.5 cm). Air and solvent were mixed outside a given reactor and conveyed through a dip tube to the shear mixer positioned in the reactor. Since the installation of the shear mixers, polymer has been eliminated in the first seven reaction stages and polymer formation has been reduced to 0.25 cubic feet (0.007 $m^3$) every 8 hours.

Although the mixers in this example had only one aperture for forming gas bubbles, additional apertures should enhance this performance. Skilled artisans can readily determine how many additional apertures might suit their application without undue experimentation.

EXAMPLE 4

A gas/liquid shear mixer was installed in a 2000 gallon (56.6 $m^3$) vessel that was being used to air strip water from an organic compound susceptible to free radical polymerization. The oxygen in air activated a free radical inhibitor in this system. The gas/liquid shear mixer (like that used in Example 3) operated at 4.0 standard cubic feet per minute (SCFM) (119.7 SLM) air flow and 50 gallons per minute (0.19 $m^3$/min) recycle monomer flow rate. The shear mixer had an inside diameter of 1 inch (2.4 cm) and a length of approximately 4 feet (1.2 m). The initial batch contained approximately 2 percent, by weight, of water in an organic monomer and was air stripped to less than 0.0500 percent in twelve hours. Stripping conditions were 80 mm Hg absolute pressure and 60° C. Of the four batches air stripped in this manner, none formed any polymer.

EXAMPLE 5

A vessel 0.6 meters in diameter and 4.57 meters in height with a liquid height of 4.27 meters was filled with acclimated activated sludge from an industrial wastewater treatment facility. The total suspended solids (TSS) was 2600 mg/L. The 0.086 $m^3$ headspace was purged with nitrogen gas at 5 SLM as measured by a Brooks Instrument Mass Controller (model 5851 I). Feed liquor was supplied at 0.19 $m^3$/hour for a residence time of 6.3 hours. The feed liquor was wastewater from an industrial oxygenated hydrocarbon plant with a salinity of 70 g/L (about 7 weight percent). The substrate concentration was 150 mg/L. The system was aerated using a coarse bubble sparger with an orifice diameter of 0.005 meters at 1.14 SLPM of oxygen, as measured by a Brooks Instrument mass flow controller (model 5851 I), and allowed to come to a steady state for 1 hour. The dissolved oxygen concentration was 0.1 mg/L as measured by an Ingold Electronics Inc. DO Sensor/Transmitter (model 4300), the vent oxygen was 15.9% as measured by a Teledyne Analytic Instruments Model TAI 322 multichannel oxygen monitoring system, resulting in a calculated oxygen transfer efficiency of 23%. At this point, the oxygen flow was abruptly redirected to a shear mixing device representative of the present invention, as shown in FIG. 2, with the oxygen flow and all other parameters remaining constant. The vent oxygen concentration immediately began to decrease and the resultant calculated oxygen transfer efficiency began to increase. After 7 minutes, the transfer efficiency was 50% with a vent oxygen concentration of 10.2%. At 13 minutes, the transfer efficiency was 70% with a vent oxygen concentration of 6.4%. At 52 minutes, the transfer efficiency was 90% with a vent oxygen concentration of 2.2% which established a new steady state value. After this, the dissolved oxygen began to climb rapidly to a steady state value of 5 mg/l.

EXAMPLES 6–8

Examples 6–8 and Comparative Examples A and B were conducted in a 30-liter, vertically mounted, cylindrical CSTR equipped with 4 vertical baffles and an agitator with either one or two impellers. Comparative Examples A and B used a lower impeller that was a 5-inch diameter Chemineer™ CD-6 and an upper impeller that was a 5-inch diameter Lightning™ A-315. Examples 6–8 used only the Lightning™ A-315 impeller.

For Examples 6–8 aqueous HOCl solution was continuously added near the center of the impeller. Liquid was pumped from the bottom of the CSTR and returned to the CSTR just below the bottom of the impeller via a recycle line and a 0.295-inch inside diameter mixing device of the present invention (constructed as in FIG. 3) which was mounted external to the CSTR, at the inlet port to the vessel. Olefin gas entered this mixing device perpendicular to the liquid flow through a 0.295-inch inside diameter tube. Product was continuously removed from the vessel through the recycle line in order to maintain a constant liquid level in the CSTR.

For the comparative samples A and B the aqueous HOCl solution was continuously added near the center of the lower impeller. The olefin gas was added below the lower impeller through a 4-inch diameter sparger ring constructed of ¼-inch diameter tubing. The sparger ring had twelve 1/32-inch holes evenly spaced around the ring. Product was continuously removed from the vessel through a bottoms pump in order to maintain a constant liquid level in the CSTR.

EXAMPLE 6

Production of Propylene Chlorohydrin using the Inventive Shear Mixing Apparatus

The CSTR described above was operated at 50 psig pressure, 69° C., and an agitator speed of 400 revolutions per minute (rpm). A 5.8 wt % HOCl solution was added at 255 lb/hr along with 215 lb/hr water. Liquid was recycled at a rate of 3200 lb/hr through the mixer, providing a superficial liquid velocity of 31 ft/sec. Propylene gas was added through the mixer at a rate of 12.5 lb/hr, for a superficial gas velocity of 10 ft/sec and a liquid to gas velocity ratio of 3.1. Product was continuously removed from the bottom of the CSTR at a rate of 483 lb/hr. The reaction time was 2 minutes to provide a 99% conversion of HOCl and a propylene chlorohydrin product yield of 98.0% based on propylene.

Comparative Example A

Production of Propylene Chlorohydrin with the Conventional Gas Sparger

The CSTR described above was operated at 50 psig pressure,71° C., and an agitator speed of 560 rpm. A 5.65 wt % HOCl solution was added at 115 lb/hr along with 63 lb/hr water. Fresh propylene was added through the ring sparger at 4.7 lb/hr along with 10 lb/hr of recycle propylene from the reactor headspace. Product was continuously removed at 183 lb/hr. The reaction time was 12 minutes, with a 99.8% conversion of HOCl and a propylene chlorohydrin product yield of 97.5% based on propylene.

EXAMPLE 7

Production of Butylene Chlorohydrin using the Inventive Shear Mixing Apparatus

The procedure of Example 6 was repeated using butylene gas at a rate of 8.1 lb/hr. The reaction conditions included 20 psig pressure, 66° C., and 400 rpm agitation speed for the single impeller. The liquid feed was a 5.6 wt % HOCl solution at 150 lb/hr along with 168 lb/hr water. Liquid was recycled through the shear mixer at a rate of 3400 lb/hr, for a superficial velocity of 31.9 ft/sec. The superficial gas velocity was 11.8 ft/sec, providing a liquid to gas velocity ratio of 2.7. Product was continuously removed from the CSTR at 326 lb/hr. The reaction time was 3 minutes, with a 99.8% conversion of HOCl and a butylene chlorohydrin product yield of 94.9% based on butylene.

Comparative Example B

Production of Butylene Chlorohydrin with the Conventional Gas Sparger

The procedure of Comparative Example B was followed using butylene for the gas feed at 4.7 lb/hr into the ring sparger. The reaction conditions included 20 psig pressure, 52° C., and 550 rpm agitator speed. The liquid feed was 4.9 wt % HOCl solution at 95.5 lb/hr along with 57.5 lb/hr water. Product was continuously removed at 158 lb/hr. The reaction time was 15 minutes with a 99.5% conversion of HOCl and a butylene chlorohydrin product yield of 94.2% based on butylene.

EXAMPLE 8

Production of Hexene Chlorohydrin using the Inventive Shear Mixing Apparatus

The procedure of Example 6 was again followed using 7.2 lb/hr of 1-hexene instead of propylene. The reaction conditions included 3.8 psig pressure, 78° C., and 450 rpm agitator speed. The liquid feed was a 2.14 wt % HOCl solution. Liquid from the reactor was recirculated through the mixer at a rate of 3080 lb/hr for a superficial liquid velocity of 29 ft/sec. The superficial gas velocity was 29 ft/sec, for a liquid to gas velocity ratio of 1.0. Product was continuously removed at 166 lb/hr. The reaction time was 14.4 minutes with a 100% conversion of HOCl and a hexene chlorohydrin product yield of 88.2% based on hexene.

What is claimed is:

1. A shear mixing apparatus, comprising:

a) a hollow gas and liquid receiving subassembly, and b) a bubble-generating subassembly, wherein the hollow gas and liquid receiving subassembly includes i) a central conduit having an open inlet end for receiving a liquid therein and an outlet end in fluid communication with the bubble-generating subassembly, and ii) a gas receiving housing which is disposed generally about and is spaced apart from the central conduit so as to define a passageway for the flow of a gas therethrough to the bubble-generating subassembly, and which includes at least one gas-receiving passageway for receiving a gas therethrough and communicating the same via the passageway to the bubble-generating subassembly, with the gas-receiving housing being joined at one of its ends in a gas-tight relationship to the central conduit, at a point closer to the inlet end of the central conduit than to its outlet end;

and, wherein the bubble-generating subassembly in turn includes i) a base plate which is joined to the central conduit adjacent its outlet end in a gas-tight relationship, ii) a gas and liquid distribution housing for containing and distributing gas and liquid received from the gas receiving housing and central conduit, respectively, and which is joined to the base plate in a gas-tight relationship, and iii) a cover plate which is in turn joined to the gas and liquid distribution housing in a gas-tight relationship, the gas and liquid distribution housing having a central, funnel-shaped fluid expansion housing that with the base and cover plates divides the bubble-generating subassembly into an upper, liquid expansion chamber and a lower, gas expansion chamber, the funnel-shaped fluid expansion housing having a hollow stem that fits in a generally gas-tight seal over a portion of the central conduit and an outward-projecting, peripheral extension from said hollow stem that has defined therein a plurality of apertures that are in fluid communication with the gas expansion chamber and a plurality of fluid channels that are in fluid communication with the liquid expansion chamber, with the apertures being in fluid communication with the fluid channels for mixing of the gas and liquid conveyed therethrough.

2. The apparatus of claim 1, wherein the fluid channels are separated from each other by fluid diverters that are defined in the outward-projecting, peripheral extension from said hollow stem.

* * * * *